United States Patent
Chiu et al.

(10) Patent No.: US 8,110,012 B2
(45) Date of Patent: Feb. 7, 2012

(54) SYSTEM FOR HOT SOLIDS COMBUSTION AND GASIFICATION

(75) Inventors: John H. Chiu, West Hartford, CT (US); Herbert E. Andrus, Granby, CT (US); Gregory N. Liljedahl, Tariffville, CT (US); Paul R. Thibeault, Windsor, CT (US)

(73) Assignee: ALSTOM Technology Ltd, Baden (CH)

( * ) Notice: Subject to any disclaimer, the term of this patent is extended or adjusted under 35 U.S.C. 154(b) by 369 days.

(21) Appl. No.: 12/533,780

(22) Filed: Jul. 31, 2009

(65) Prior Publication Data

US 2010/0050654 A1 Mar. 4, 2010

Related U.S. Application Data

(60) Provisional application No. 61/085,248, filed on Jul. 31, 2008, provisional application No. 61/098,262, filed on Sep. 19, 2008.

(51) Int. Cl.
*B01J 7/00* (2006.01)

(52) U.S. Cl. ............ 48/61; 48/128; 48/198.5; 48/201; 48/210; 48/212; 48/215; 48/76; 48/72; 48/77; 48/127.9; 423/428; 252/373; 252/376; 60/780; 60/676; 60/39.15; 60/39.12; 60/39.5; 422/189

(58) Field of Classification Search ............... 48/61, 76, 48/75, 214; 60/780, 676; 422/187
See application file for complete search history.

(56) References Cited

U.S. PATENT DOCUMENTS

| 4,032,305 | A  | 6/1977  | Squires          |
|-----------|----|---------|------------------|
| 4,069,304 | A  | 1/1978  | Starkovich et al.|
| 7,083,658 | B2 | 8/2006  | Andrus, Jr.      |
| 2004/0079087 | A1 | 4/2004 | Chandran et al. |
| 2004/0237404 | A1 | 12/2004 | Andrus, Jr. et al. |

OTHER PUBLICATIONS

PCT International Search Report and The Written Opinion of the International Searching Authority dated Oct. 14, 2010—(PCT/US2010/052467).

*Primary Examiner* — Kaity V. Handal
(74) *Attorney, Agent, or Firm* — Michaud-Kinney Group LLP (57) ABSTRACT

In a retrofit system for hot solids combustion and gasification, a chemical looping system includes an endothermic reducer reactor 12 having at least one materials inlet 22 for introducing carbonaceous fuel and $CaCO_3$ therein and a CaS/gas outlet 26. A first CaS inlet 40 and a first $CaSO_4$ inlet 64 are also defined by the reducer reactor 12. An oxidizer reactor 14 is provided and includes an air inlet 68, a $CaSO_4$/gas outlet 46, a second CaS inlet 44, and a second $CaSO_4$ inlet 66. A first separator 30 is in fluid communication with the CaS/gas outlet 26 and includes a product gas and a CaS/gas outlet 32 and 34 from which CaS is introduced into said first and second CaS inlets. A second separator 50 is in fluid communication with the $CaSO_4$/gas outlet 46 and has an outlet 52 for discharging gas therefrom, and a $CaSO_4$ outlet from which $CaSO_4$ is introduced into the first and second $CaSO_4$ inlets 62, 66. The chemical looping system is in fluid communication with at least a portion of an existing power generation system.

16 Claims, 7 Drawing Sheets

SYSTEM FOR HOT SOLIDS COMBUSTION AND GASIFICATION

CROSS-REFERENCE TO RELATED APPLICATIONS

This application claims the benefit of U.S. provisional application No. 61/085,248 filed Jul. 31, 2008 and U.S. provisional application No. 61/098,262 filed Sep. 19, 2008, the contents of which are incorporated herein by reference in their entirety.

FIELD OF THE INVENTION

The disclosure herein is generally directed to the capture of $CO_2$ in existing power plants and is more particularly directed to retrofitting existing power generation systems with a chemical looping system.

BACKGROUND OF THE INVENTION

Fossil fuel power stations conventionally use steam turbines to convert heat into electricity. Conversion efficiencies of new steam power stations can exceed 40% LHV. New supercritical steam boiler designs, relying on new materials, allow higher steam temperatures and pressures, providing efficiencies of close to 50% LHV and further improvements might be expected. Significant advancements have also been made in combined cycle gas turbines (CCGTs). A gas turbine can withstand much higher inlet temperatures than a steam turbine. This factor produces considerable increases in overall efficiency. The latest designs currently under construction can achieve efficiencies of over 60% LHV. All of these improvements in efficiency translate into a reduction of the specific emissions on a per megawatt basis.

Although substantial reductions in emissions of $CO_2$ could be achieved by an increase in efficiency of energy conversion and utilization, such reductions may not be sufficient to achieve atmospheric $CO_2$ stabilization. Therefore, efforts have also been directed towards the capture and sequestration of the $CO_2$ emitted by fossil fuel-fired power plants. Sequestration of $CO_2$ entails the storage or utilization of $CO_2$ in such a way that it is kept out of the atmosphere. Capture of the $CO_2$ may be performed prior to or after combustion of the fuel. Production of $CO_2$ may be minimized during combustion of the fuel.

The fuel may be de-carbonized prior to combustion by extracting $H_2$ from the hydrocarbon fuel, the $CO_2$ being captured and the $H_2$ being subsequently combusted or put to other use such as in a fuel cell. Steam reforming, gasification and partial oxidation are examples of such processes. Another decarbonization approach is via Integrated Gasification Combined Cycle (IGCC). With IGCC, coal is gasified to produce a synthesis gas, which is then catalytically water gas shifted in order to increase the $CO_2$ concentration. This shifted synthesis gas is quenched, and $CO_2$ is removed with a solvent, such as selexol, in a process analogous to the amine flue gas scrubbing. Separated $CO_2$ is dried and compressed to supercritical conditions for pipeline transport. The cleaned synthesis gas, now rich in $H_2$, is fired in a combustion turbine, and waste heat from the gasification quench and from the GT fuel gas is recovered to raise steam and feed a steam turbine. Because the $CO_2$ is removed from the concentrated and pressurized synthesis gas stream, the incremental capital cost and energy penalty is lower than for the capture of $CO_2$ from flue gas. A study by Parsons Energy and Chemical Group, Inc. has shown an incremental energy penalty of about 14% and the cost of $CO_2$ mitigation of about $18/tonne (Owens, et al., 2000).

Combustion of the fossil fuel in $O_2$/recycled flue gas eliminates the need for capture of $CO_2$ by using pure or enriched oxygen instead of air for combustion. A substantial energy penalty is incurred using this process due to the large power requirements of producing pure oxygen. Alternatively, separation of $CO_2$ after combustion with gas can be accomplished by a variety of techniques. The most well established method today is removal from the flue gas stream by amine solvent scrubbing in an absorption-stripping process. Such processes are already applied commercially to coal-fired boilers for the purpose of producing $CO_2$ for industrial or food industry use. Unfortunately, substantial capital equipment and land space are required. The efficiency of the power plant is significantly reduced by the energy required to regenerate the solvent. Studies of amine scrubbing technology applied to a U.S. utility boiler case indicate that capital investment is on the order of the original power plant and energy efficiency is reduced by 41%.

SUMMARY OF THE INVENTION

In one aspect, a system for hot solids combustion and gasification utilized in retrofitting existing power generation systems is disclosed and includes a chemical looping system. The chemical looping system comprises an endothermic reducer reactor having a steam inlet for introducing steam therein. The reducer reactor includes at least one materials inlet for the introduction of carbonaceous fuel and $CaCO_3$ into the reducer reactor. The reducer reactor also includes a first CaS/gas outlet and a first CaS inlet.

A first separator defines an inlet in fluid communication with the first CaS/gas outlet, and a product gas outlet for discharging a product gas from the first separator. A CaS/gas outlet also forms part of the first separator. A first solids control valve is in fluid communication with the CaS/gas outlet, and has a first outlet in fluid communication with the first CaS inlet defined by the reducer reactor. The first solids control valve also has a second outlet in fluid communication with a second CaS inlet defined by an exothermic oxidizer reactor.

In at least one embodiment, the exothermic oxidizer reactor includes an air inlet and a second $CaSO_4$ inlet for introducing air and $CaSO_4$, respectively, into the oxidizer reactor. A first $CaSO_4$/gas outlet is defined by the oxidizer reactor and is in fluid communication with an inlet defined by a second separator. The second separator includes a first gas outlet for discharging $N_2$ therefrom, and a $CaSO_4$ outlet. A second solids control valve has an inlet in fluid communication with the $CaSO_4$ outlet. First and second outlets are also defined by the second solids control valve and are in fluid communication with the first and second $CaSO_4$ inlets. The first and second solids control valves control the amount of solids sent to the reducer reactor and the oxidizer reactor. The valves can include, but are not limited to, seal pot valves, fluidized bed or any other valves or particle distributors.

In one embodiment, the chemical looping system, as explained in detail below, is retrofit to an existing power plant and the first product gas is hydrogen ($H_2$) with the product gas outlet defined by the first separator being in fluid communication with a boiler forming part of the existing power plant, for the introduction of $H_2$ generated by the chemical looping system into the boiler for use as a fuel therein. The chemical looping system is also configured to produce substantially $CO_2$-free hydrogen while capturing substantially pure $CO_2$ as a separate stream from a calciner for use or sequestration. During operation, the calciner receives calcium carbonate ($CaCO_3$) from the reducer reactor and converts it to calcium oxide (CaO) and carbon dioxide ($CO_2$) which is discharged from the calciner and can be sequestered. The CaO can be separated and discharged from the calciner and provided to the oxidizer reactor. The discharged CaO can also be directed back to the first separator forming part of the chemical looping system. Heat for the reaction that takes place in the calciner can come from the $CaCO_3$, or it can be drawn from any location within the chemical looping system. For example, hot solids from the oxidizer could be introduced in the calciner. Existing coal preparation devices such as, but not limited to, crushers and pulverizers forming part of the power plant can be used to prepare coal and limestone for use in the chemical looping system. An advantage of retrofitting an existing power generation system in the above-described manner is that little modification would be required to the boiler that forms part of the existing power plant. The power generation systems described herein can be, but are not limited to, the pulverized coal systems or circulating fluidized bed systems. Moreover, while limestone has been described, the disclosure herein is not limited in this regard as other calcium bearing materials such as, but not limited to, lime, dolomite and spent circulating fluidized bed ash, may be substituted.

In another embodiment, the chemical looping system can be retrofit to an existing power generation system, and the product gas is $CO_2$. In this embodiment, the boiler that typically forms part of an existing power plant is eliminated. The heat normally transferred from the boiler to generate superheated steam is now obtained from the chemical looping system. For example, heat exchanger means can be positioned in the oxidizer reactor for converting at least one of water, water vapor and steam into superheated steam, the superheated steam being fed directly into a steam turbine. However, the present invention is not limited in this regard as the above-described heat exchanger means can be positioned essentially anywhere within the chemical looping system where sufficient heat is present. In this embodiment, the chemical looping system is also configured to capture $CO_2$ generated therein. Similar to the above-described embodiment, coal preparation devices forming part of an existing power generation system could be used to prepare coal and limestone for the chemical looping system. The chemical looping system would be configured so that during operation, it would produce superheated steam by transferring heat generated in the oxidizer reactor or other area of the chemical looping system to the heat exchanger means. The $CO_2$ produced and captured can be used in an Enhanced Oil Recovery (EOR) process or it can be sequestered. The steam produced is sent to an existing steam turbine forming part of the retrofitted power generation system, thereby eliminating the need for the boiler in the existing power plant.

In yet another embodiment, the product gas is $CO_2$ and the boiler forming part of the existing power generation system to which the chemical looping system is retrofit is used as the oxidizer reactor. Using the existing boiler as the oxidizer reactor avoids the need to include the oxidizer, and superheat steam production equipment in the chemical looping system. In this embodiment, the reducer reactor is in fluid communication with the first separator for the receipt of CaS and gas generated in the reducer. The first separator then discharges $CO_2$ from the first outlet for sequestration and CaS/gas from a second outlet in fluid communication with the first solids valve. The first solids valve has a first outlet in fluid communication with the reducer reactor and the second outlet in fluid communication with the existing boiler that is utilized and configured in this embodiment to operate as an oxidizer reactor. The boiler/oxidizer reactor is in fluid communication with the second separator for discharging $CaSO_4$/gas into an inlet defined by the second separator. Nitrogen ($N_2$) is discharged from a first outlet defined by the second separator and $CaSO_4$/gas is discharged from a second outlet defined by this second separator that is in turn in fluid communication with a second solids control valve. The second solids control valve is in fluid communication with the reducer reactor and the boiler/oxidizer reactor for introducing $CaSO_4$ therein.

The above-described and other features are exemplified by the following figures and detailed description.

BRIEF DESCRIPTION OF THE DRAWINGS

Referring now to the figures, which are exemplary embodiments, and wherein like elements are numbered alike.

DETAILED DESCRIPTION OF THE EMBODIMENTS

Figure 1:
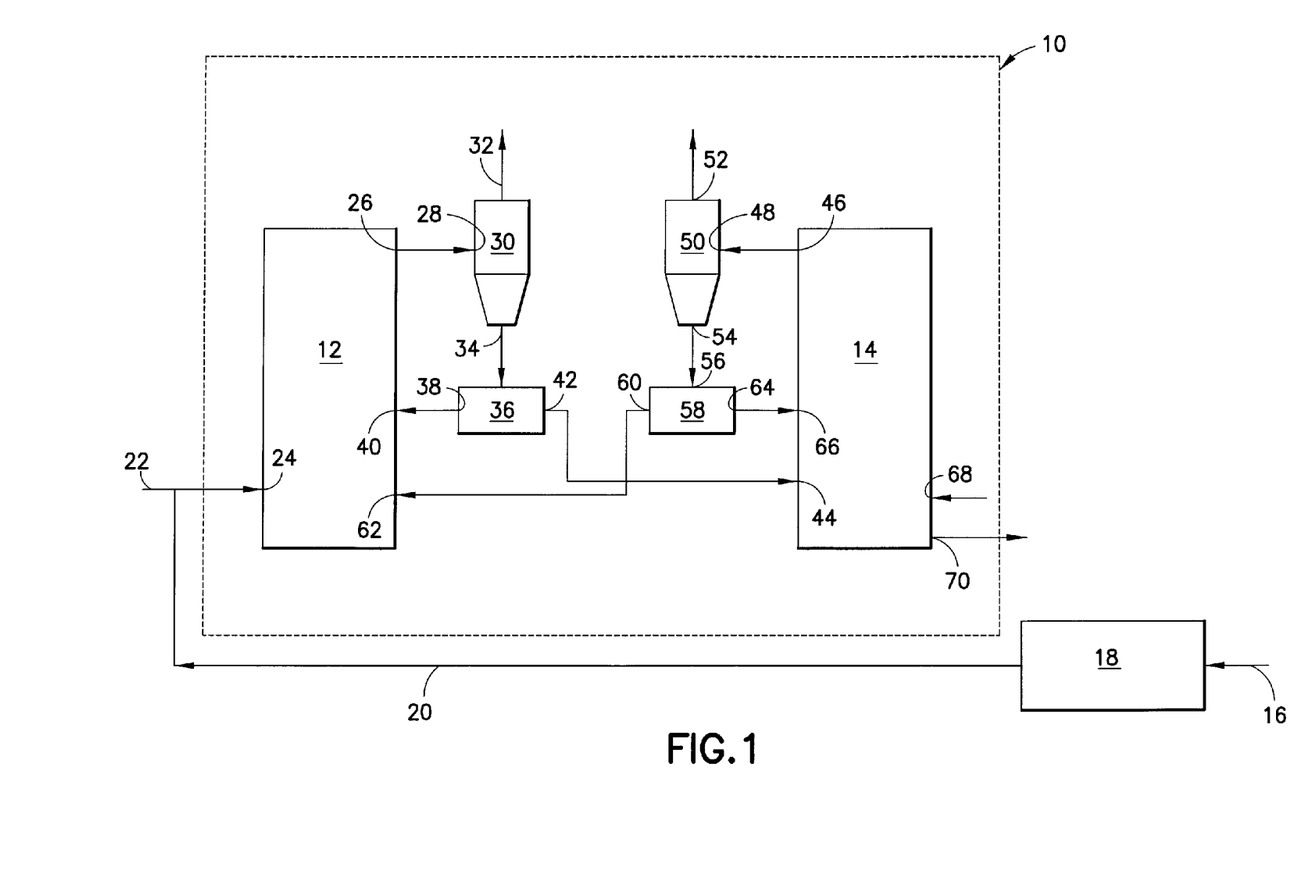
FIG. 1 is a schematic illustration of an embodiment of a chemical looping system.

As shown in FIG. 1, a chemical looping system is generally designated by the reference number 10 and is encompassed by the dotted lines shown in the figure. Chemical looping is described in U.S. Pat. No. 7,083,658, the contents of which are incorporated in entirety by reference herein. The chemical looping system 10 includes an endothermic reducer reactor 12 and an oxidizer reactor 14. Fuel, in the form of coal and $CaCO_3$ (limestone) are fed via conduit 16 into a coal preparation device 18. The coal preparation device 18 can form part of an existing power plant such as, but not limited to, a pulverized coal or fluidized bed power plant, to which a chemical looping system can be retrofit. The coal and $CaCO_3$ are fed through conduit 20 to an inlet 24 into the reducer reactor. Steam is also fed via conduit 22 into the reducer reactor 12 via the inlet 24. However, the coal, $CaCO_3$ and the steam can also each be fed into the reducer reactor 12 through separate inlets. Moreover, while coal has been described herein, other fuels can also be used, such as, but not limited to, coal waste, oil residue, petcoke, or other carbon-based fuels.

In addition, while the coal and $CaCO_3$ have been described as being processed by the coal preparation devices 18, the present disclosure is not limited in this regard as preparation devices can be used for the coal and the $CaCO_3$. While limestone has been described herein, the present disclosure is not limited in this regard as other calcium containing materials could be employed such as, but not limited to, dolomite, lime, and spent continuous fluidized bed ash. While particular particles are described as coming out of the various inlets and outlets, one will appreciate that a portion of all of the different particulates described herein flows through each inlet and outlet.

The reducer reactor 12 also includes a CaS/gas outlet 26 in fluid communication with an inlet 28 defined by a first separator 30 shown in the illustrated embodiment as a cyclone. The cyclone includes a product gas outlet 32 and, as will be explained in greater detail below, a CaS/gas outlet 34. In the illustrated embodiment, the cyclone 30 is in fluid communication with an inlet of a first solids control valve 36. The solids control valve 36 has a first outlet 38 in fluid communication with a first CaS inlet 40 into the reducer reactor 12. The solids control valve 36 also has a second outlet 42 in fluid communication with a second CaS inlet 44 into the oxidizer reactor 14. During operation, the first and second outlets, 38 and 42 respectively, provide CaS to the first and second CaS inlets, 40 and 44 respectively. While the first separator 30 has been described as being a cyclone, the present invention is not limited in this regard as other separators known to those skilled in the art to which the present disclosure pertains, such as a centrifuge, multistage separator or a bagfill scrubber, can also be employed.

Still referring to FIG. 1, the oxidizer reactor 14 defines a $CaSO_4$/gas outlet 46 in fluid communication with an inlet 48 to a second separator 50 shown in the illustrated embodiment as a cyclone. The second separator 50 further includes a first outlet 52 for discharging waste gas $N_2$ therefrom, and a $CaSO_4$/gas outlet 54 in fluid communication with an inlet 56 to a second solids control valve 58. The second solids control valve 58 includes a first outlet 60 in fluid communication with a first $CaSO_4$ inlet 62 into the reducer reactor 12, and a second outlet 64 in fluid communication with a second $CaSO_4$ inlet 66 into the oxidizer reactor 14. The oxidizer reactor 14 also includes an air inlet 68 for the introduction of air into the oxidizer reactor and an outlet 70 for discharging $CaSO_4$ and ash for disposal.

During operation of the chemical looping system 10, coal is burned by using air indirectly as follows. Coal, limestone and steam are added to the reducer reactor 12 at inlet 24. The limestone captures sulfur in the coal forming CaS (calcium sulfide) in the reducer reactor 12. Depending on the air-to-coal ratio, as well as the configuration of the chemical looping system, CaS and gases are discharged from the reducer reactor at 26 and into a first separator at 30. The first separator 30 is operable to separate a product gas, discussed in greater detail below, from the CaS. The product gas is discharged from the first separator at the product gas outlet 32 with the CaS being discharged from the CaS outlet 34 and into the first solids control valve 36. The CaS is discharged from the solids control valve 36 via the first outlet 38 and a second outlet 42 and is introduced into the reducer reactor 12 and the oxidizer reactor 14 at inlets 40 and 44 respectively. Air is introduced into the oxidizer reactor 14 at the inlet 68 and the CaS is burned in a heat liberating reaction with the air therein producing hot $CaSO_4$ (calcium sulfate). The hot $CaSO_4$ and gas, generally mostly nitrogen, exits the oxidizer reactor 14 at the $CaSO_4$/gas outlet 46 and into the second separator 50 via the inlet 48. The second separator 50 is operable to separate the gas from the hot $CaSO_4$ and discharge at least a portion of the gas from the second separator via the outlet 52. The hot $CaSO_4$ is discharged from the second separator 50 via the $CaSO_4$ outlet 54 and is introduced into the second solids control valve 58 via the inlet 56. The $CaSO_4$ is then discharged from the second solids control valve 58 via the first outlet 60, and a second outlet 64 and is introduced into the reducer reactor 12 and the oxidizer reactor 14 at inlets 62 and 66 respectively. The hot $CaSO_4$ cycled to the reducer reactor 12 supplies the oxygen and heat to burn the coal and reduce the $CaSO_4$ to CaS for continuous recycle.

While particular particles are described as coming out of the various inlets and outlets, one will appreciate that a portion of all of the different particulates described herein flows through each inlet and outlet, such as C, $CaSO_4$, CaS, CaO, $CaCO_3$ and ash.

Figure 2:
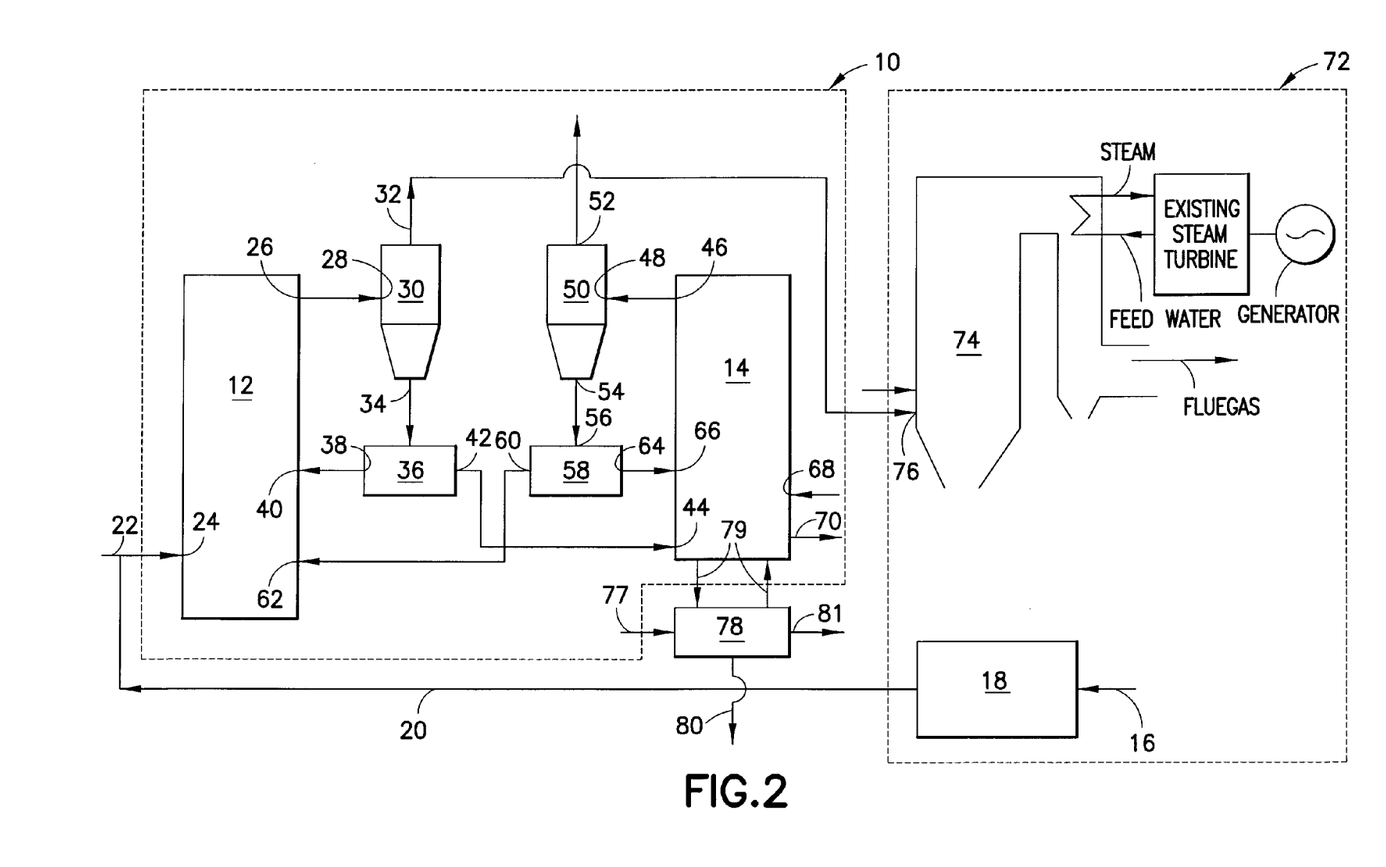
FIG. 2 is a schematic illustration of a chemical looping system retrofit to an existing power plant where hydrogen is produced in the chemical looping system and fed as a fuel to a boiler forming part of the existing power plant, in accordance with the present invention.

As shown in FIG. 2, the chemical looping system 10 is retrofit to an existing power generation system generally indicated by the reference number 72. In the illustrated embodiment, the power generation system 72 includes a boiler 74 having an inlet 76. The remaining components forming part of the depicted power generation system are shown for illustrative purposes only and are not to be construed in a limiting sense. The chemical looping system 10 operates in the same manner as described above with respect to FIG. 1. The product gas for this embodiment is substantially $CO_2$ free $H_2$ (hydrogen) and is discharged from the first separator 20 via the product gas outlet 32. This hydrogen is generated using an air-to-coal ratio of approximately 0.1-0.6. In other words, the chemical looping system 10 is being run fuel-rich. The hydrogen is fed into a boiler 74 at inlet 76 to be used as fuel for the existing power generation system.

During operation, a calciner 78 receives calcium carbonate $CaCO_3$ at inlet 77 from the reducer reactor 12 or the solids control valve 36 and converts it to calcium oxide (CaO) and carbon dioxide $CO_2$. The $CO_2$ is discharged from the calciner 78 at outlet 80 and can be sequestered. The CaO can be discharged from the calciner and inserted into the reducer reactor 12 or the oxide reactor. The CaO can also be directed back to the first separator 30. Heat for the reaction that takes place in the calciner 78 can come from the $CaCO_3$ or it can be drawn from any location within the chemical looping system. For example, hot solids from the oxidizer reactor 14 could be cycled through the calciner 78 via conduits 79.

Figure 3:
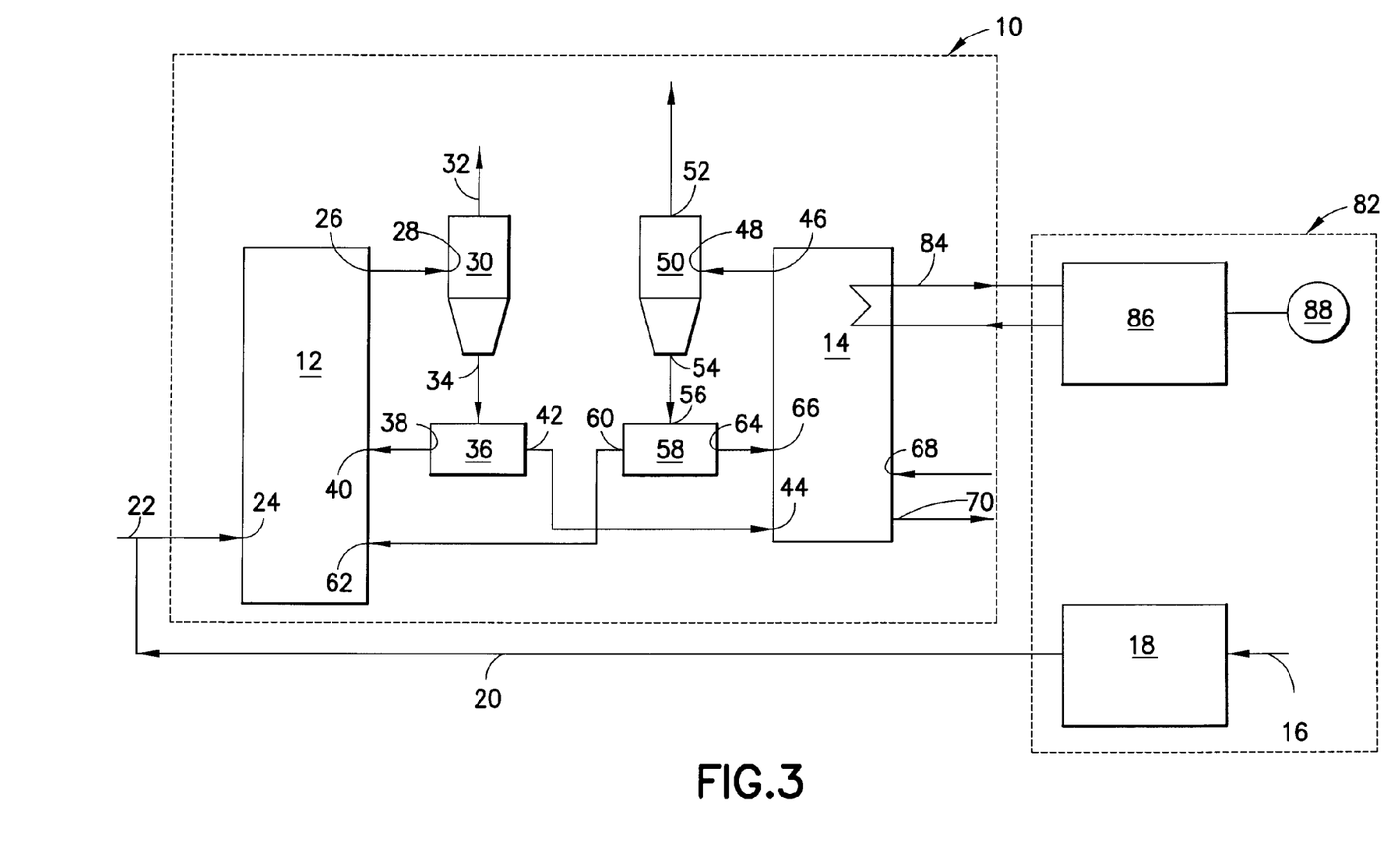
FIG. 3 is a schematic illustration of a chemical looping system configured to produce superheated, high pressure steam in an oxidizer reactor forming part of the chemical looping system, the steam being fed directly to a steam turbine, in accordance with the present invention.

As shown in FIG. 3, the chemical looping system 10 is retrofit to an existing power generation system generally indicated by the reference number 82. In the illustrated embodiment, no boiler is necessary to generate power. Instead, high pressure superheated steam is generated in the oxidizer reactor 14 via an exchange of heat to a heat exchanger 84 positioned in the oxidizer reactor. The heat is generated by the burning of CaS with air that in turn gasifies coal. In this embodiment, the product gas discharged from the product gas outlet 32 is $CO_2$ and the air-to-coal ratio is approximately 1.0-2.0 (air rich). The superheated steam is directed to an existing steam turbine 86 that in turn drives a generator 88. While the heat exchanger 84 has been described as being positioned in the oxidizer reactor 14, the disclosure herein is not limited in this regard as the heat exchanger can be positioned anywhere within the chemical looping system where adequate heat energy is present such as, for example, in the reducer reactor.

Figure 4:
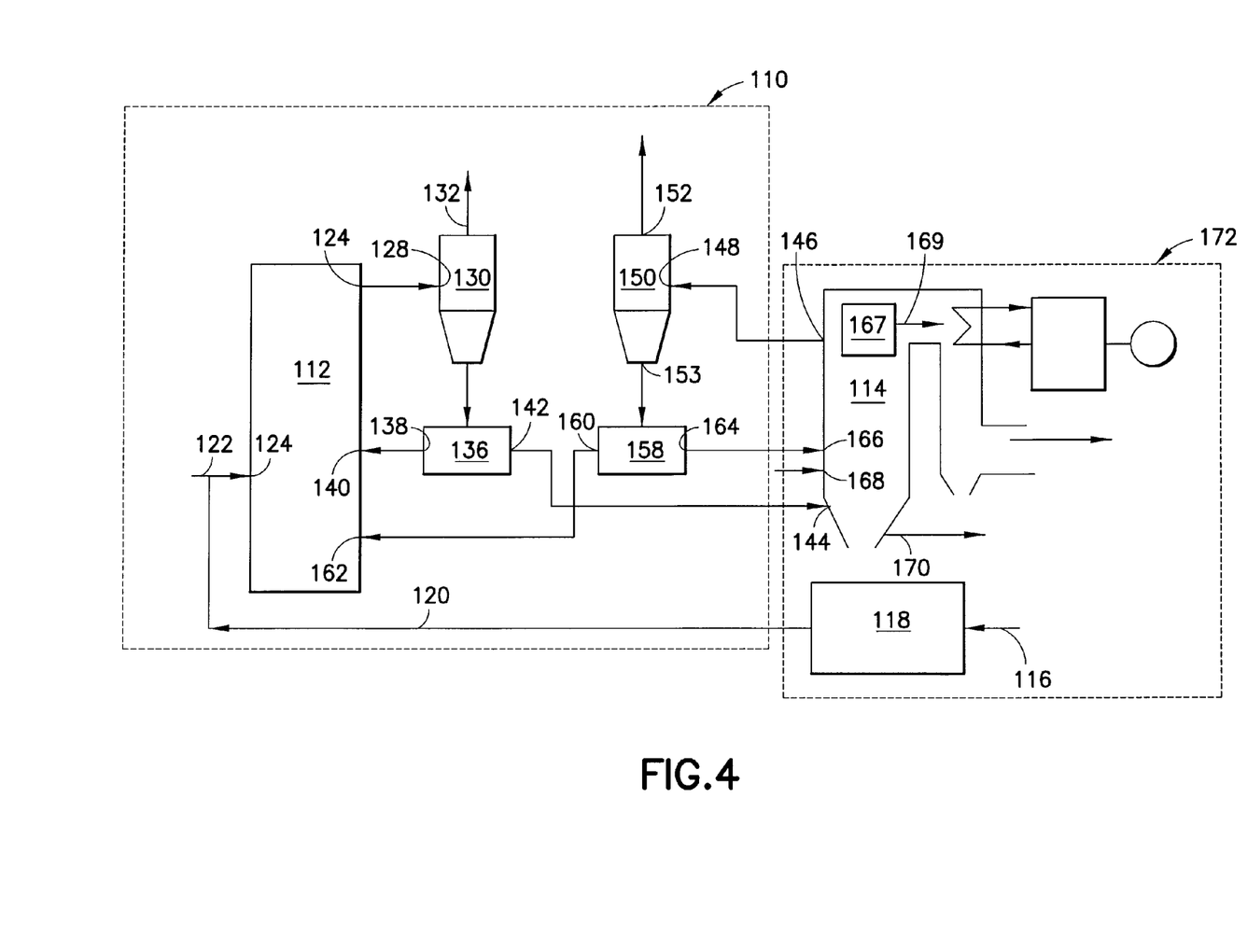
FIG. 4 is a schematic illustration showing the use a boiler forming part of an existing power plant as the oxidizer reactor in the chemical looping system, in accordance with the present invention.

Turning to FIG. 4, the embodiment illustrated therein is similar to that shown in FIG. 2. Accordingly, like elements will be given like reference numbers preceded by the numeral 1. The difference between the embodiment illustrated in FIG. 4 and that of FIG. 2 is that the existing boiler 174 forming part of the existing power generation system 172 is used as the oxidizer reactor in the chemical looping system. Accordingly, the portion of a chemical looping system that is retrofit to an existing power generation system is generally designated by the reference number 110 and includes a reducer reactor 112. The reducer reactor 112 defines a CaS/gas outlet 124 in fluid communication with an inlet 128 of a first separator 130. The first separator 130 is shown in the illustrated embodiment as being a cyclone. However, the present disclosure is not limited in this regard as other types of separators, such as a centrifuge, multistage separator or bagfill scrubber, can be utilized without departing from the broader aspects of the instant disclosure. The first separator 130 includes a first outlet 132 for the discharge of $CO_2$ and a second outlet 133 in fluid communication with a first solids control valve 136. The solids control valve 136 includes a first outlet 138 in fluid communication with a CaS inlet 140 into the reducer reactor 112 and a second outlet 142 in fluid communication with a second inlet 144 into the boiler 114 which in the instant embodiment is functioning as the oxidizer reactor in the chemical looping system. The boiler/oxidizer reactor 114 includes an outlet 146 in fluid communication with an inlet 148 into a second separator 150. The second separator 150 has a first outlet 152 for discharging waste gas, typically substantially nitrogen therefrom. The second separator 150 also has a second outlet 153 in fluid communication with a second solids control valve 158 for receiving $CaSO_4$ therein. First and second outlets 160 and 164 from the second solids control valve are in fluid communication with inlets 162 and 166 defined by the reducer reactor 112 and the boiler/oxidizer reactor 166 for the introduction of $CaSO_4$ therein. A third separator 167 is positioned in the boiler 174 adjacent the outlet 146 and separates particulate for discharge through the outlet 146 and allows gas to travel therethrough in the direction indicated by the arrow 169.

Figure 5:
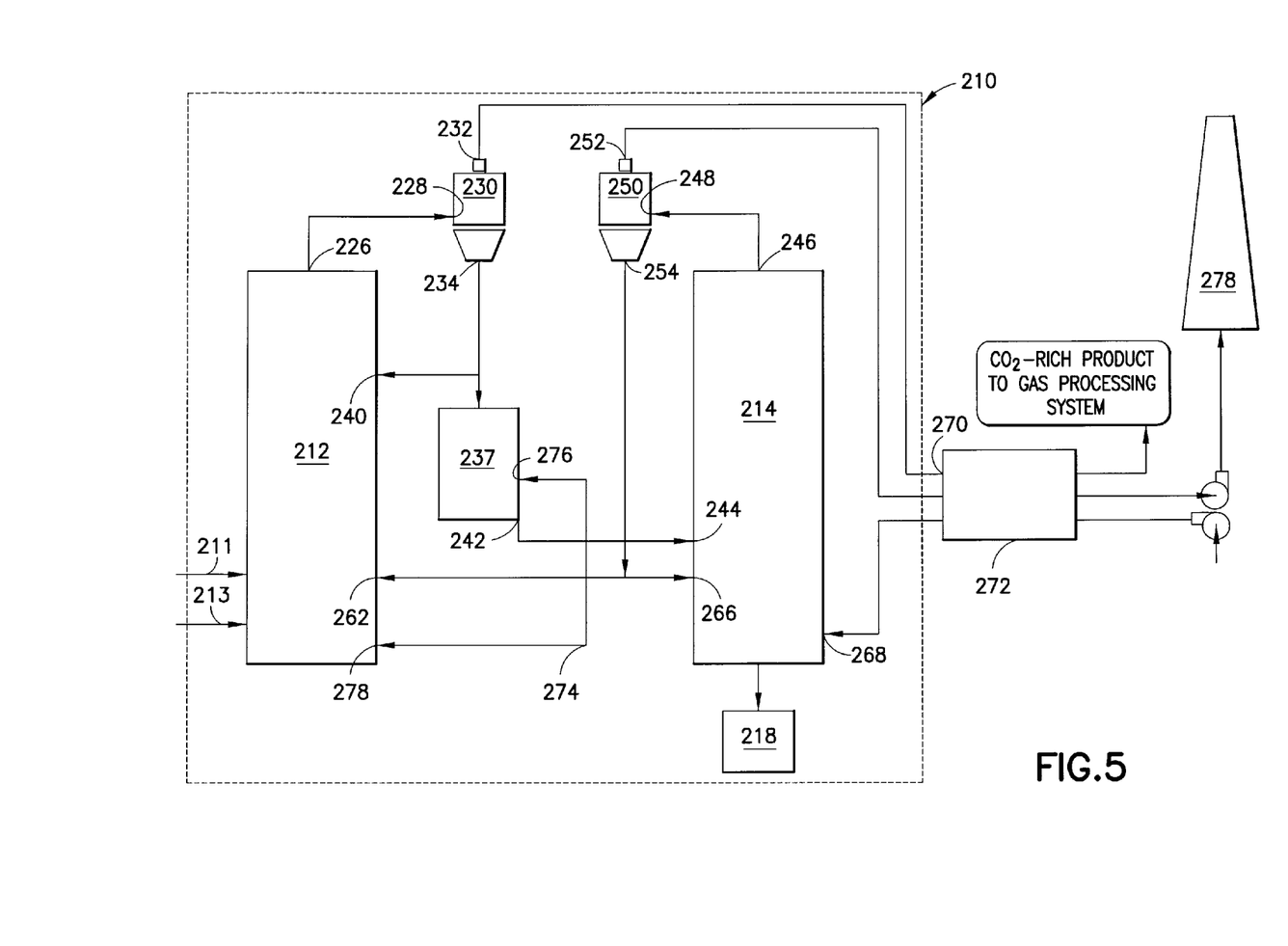
FIG. 5 is a schematic illustration of another embodiment of a chemical looping system retrofit to an existing power plant, in accordance with the present invention.

As shown in FIG. 5, another embodiment of a chemical looping system is generally designated by the reference number 210. The chemical looping system 210 is similar in some respects to the chemical looping system 10. Accordingly, like elements will be given like reference numbers preceded by the numeral 2. Coal and limestone are fed into the reducer reactor 212 at inlets 211 and 213, respectively. CaS and gas exit the reducer reactor at outlet 226 which is in fluid communication with an inlet 228 defined by a first separator 230. A product gas such as $CO_2$ exits the first separator 230 at a first outlet 232 which in the illustrated embodiment is in fluid communication with an inlet 270 into an air preheater 272. The first separator 230 includes a second outlet 234 in fluid communication with a CaS inlet 240 and a mixed bed heat exchanger 237 for introducing CaS thereto. A process stream 274 enters the mixed bed heat exchanger 237 at inlet 276 and also enters the reducer reactor at inlet 278. The mixed bed heat exchanger 237 includes an outlet 242 in fluid communication with an inlet 244 into the oxidizer reactor 214 for supplying CaS therein. The oxidizer reactor 214 defines an outlet 246 for discharging $CaSO_4$ and gas therefrom. The outlet 246 is in fluid communication with an inlet 248 into a second separator 250. The second separator 250 includes a first outlet 252 for the discharge of waste gas into the air preheater 272, and a second outlet 254 for the discharge of $CaSO_4$. The second outlet 254 is in fluid communication with a first $CaSO_4$ inlet 262 into the reducer reactor 212, and a second $CaSO_4$ inlet 266 into the reducer reactor 214. The air preheater 272 heats air introduced into the oxidizer reactor 214 at inlet 268 via heat transferred from the $CO_2$ and waste gas discharged from the first and second separators 230 and 250, respectively. After passing through the air preheater 272, the $CO_2$ can be sequestered and the waste gas sent to a stack 278.

Figure 6:
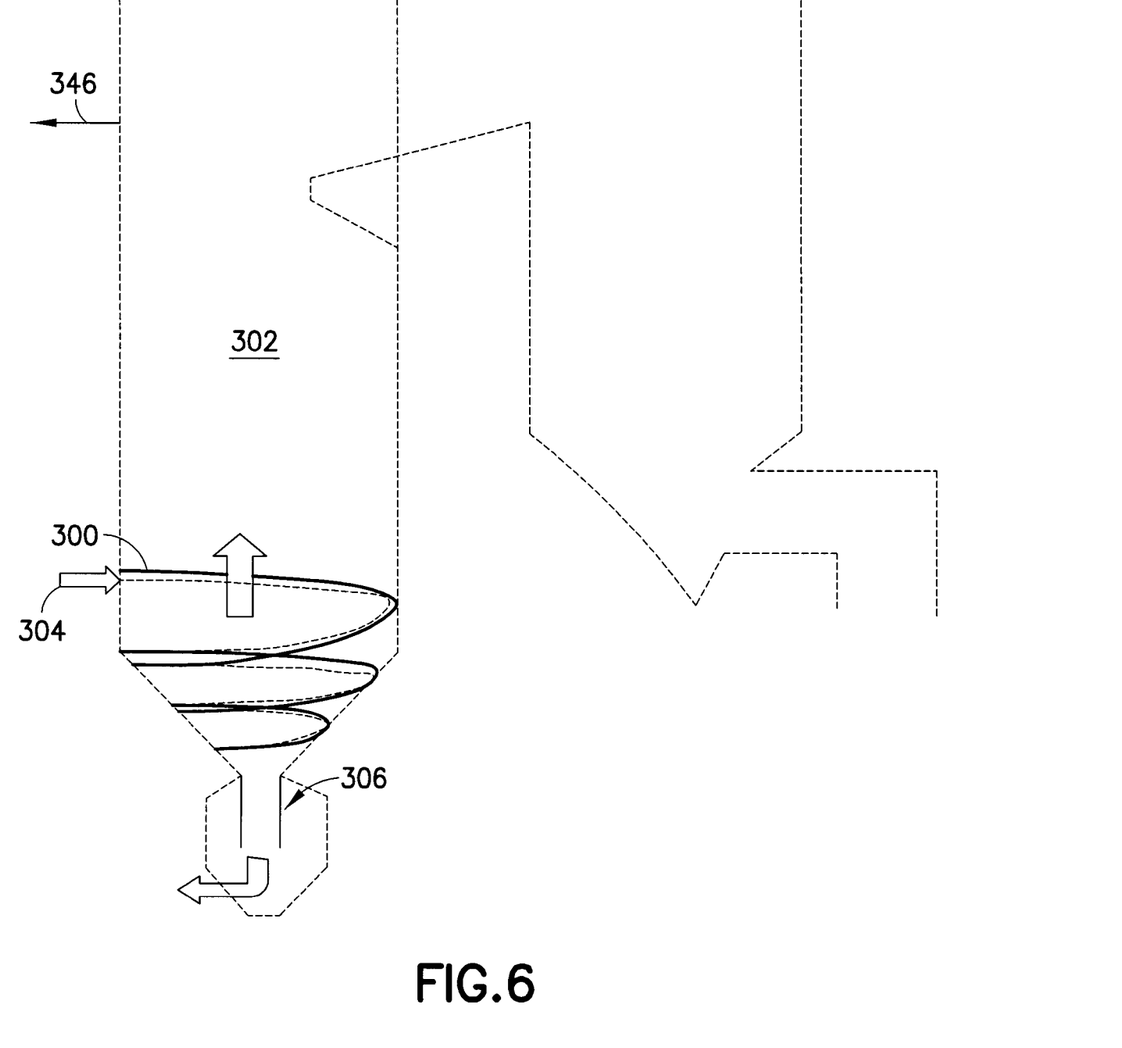
FIG. 6 schematically illustrates an embodiment wherein a curvilinear separator is positioned in an existing boiler and is operable as an oxidizer reactor, in accordance with the present invention.

There are a large number of fossil fuel boilers in use today. These boilers tend to be kept in use for long periods of time. As has been described above, existing boilers can be retrofit for use as an oxidizer reactor in a chemical looping system. Since boilers can be unique in their designs, it can prove economical to retrofit existing boilers for use as oxidizer reactors. One such retrofit is shown in FIG. 6 where a curvilinear separator (CLS) 300 is positioned within an existing boiler and acts as an oxidizer reactor for a chemical looping system. In this embodiment, CaS and excess air 304 are introduced into the CLS 300 from a reducer reactor (not shown) similar to that shown in FIG. 4. A chemical reaction take place in the CLS 300 and solids, substantially $CaSO_4$, are generated in the CLS and separated therefrom and flow into a collecting duct 306 and are then recycled back to the reducer reactor as an oxygen carrier as described herein before with respect to FIG. 4. Product gas separated in the CLS 300 is released to an existing furnace. The boiler 302 also includes an outlet 346. While a CLS has been shown and described, other separators such as, but not limited to, a ring cone separator or an impact separator can be employed.

Figure 7:
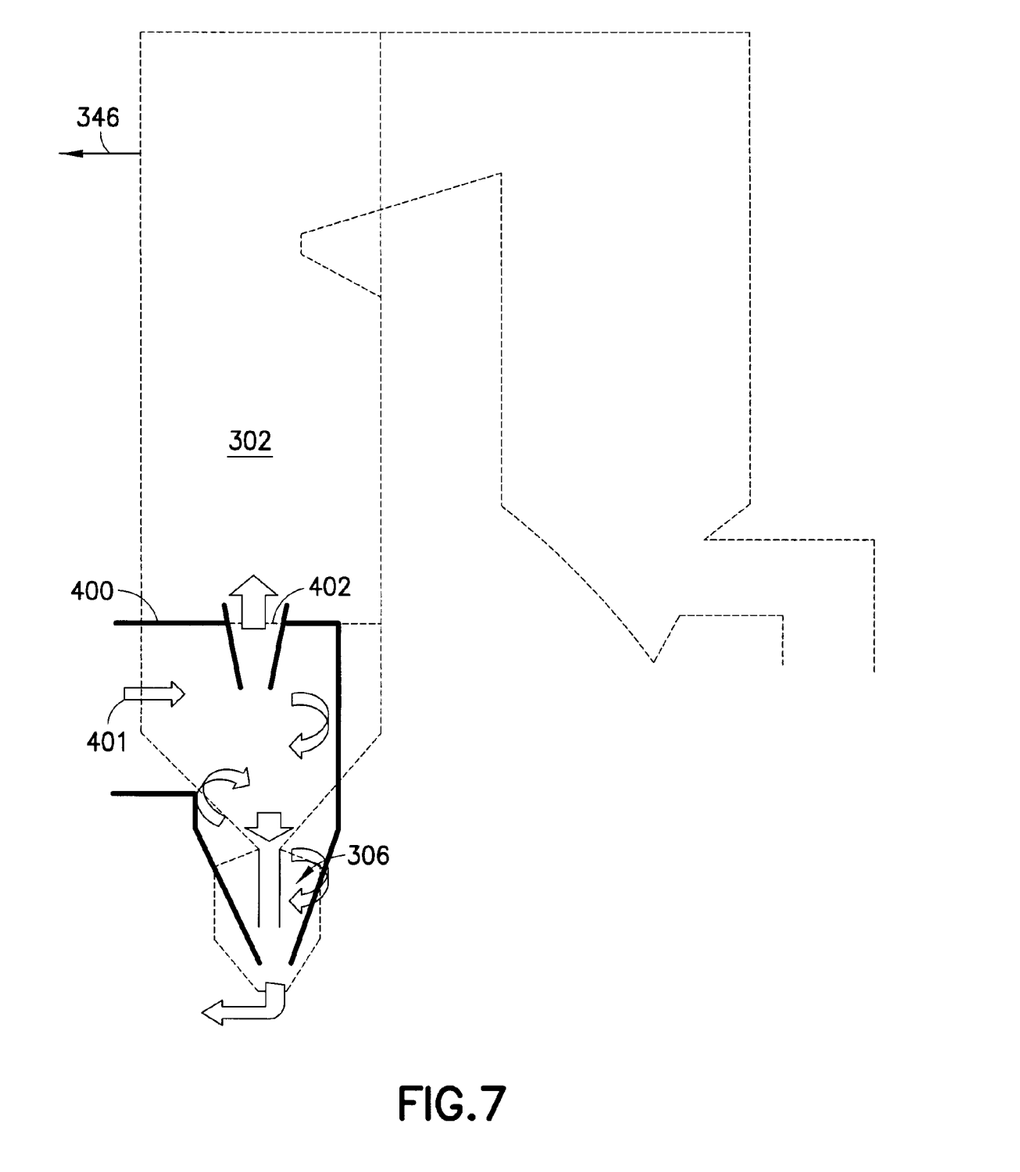
FIG. 7 schematically illustrates an embodiment wherein a cyclone is positioned in an existing boiler and is operable as an oxidizer reactor, in accordance with the present invention.

As shown in FIG. 7, instead of the CLS 300, FIG. 6, being positioned in the existing boiler 300, a cyclone 400 is positioned therein and is operable as the oxidizer reactor. Accordingly, CaS and excess air are introduced into the cyclone 400 from a reducer reactor (not shown) via an inlet 401. A chemical reaction take place in the cyclone 400 and solids, substantially $CaSO_4$, are generated in the cyclone 400 and separated therefrom and flow into a collecting duct 306 and are then recycled back to the reducer reactor as an oxygen carrier. The boiler also includes an outlet 346. Product gas separated in the cyclone 400 is released to an existing furnace via outlet 402 from the cyclone. When configured in the manner illustrated in FIGS. 5, 6 and 7, the separators 300 and 400 can operate as the second separator 50, 150 described with respect to FIGS. 1 and 2.

While the invention has been described with reference to various exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to a particular embodiment disclosed as the best mode contemplated for carrying out this invention, but that the invention will include all embodiments falling within the scope of the appended claims.

What is claimed is:

1. A system for hot solids combustion and gasification comprising:
   a chemical looping system including:
   an endothermic reducer reactor comprising:
   a steam inlet for introducing steam into said reducer reactor;
   at least one materials inlet introducing into said reducer reactor carbonaceous fuel from a fuel source and calcium containing material from a calcium source that are connected to said reducer reactor;
   a first CaS/gas outlet for discharging CaS/gas therefrom;
   a first separator defining an inlet in fluid communication with said first CaS/gas outlet, said first separator defining a product gas outlet for discharging a product gas, and a second CaS/gas outlet;

a first CaS inlet for introducing CaS into said reducer reactor, said CaS being discharged from said second CaS/gas outlet;

an oxidizer reactor having an air inlet for the introduction of air into said oxidizer reactor, a first $CaSO_4$/gas outlet and a second CaS inlet for introducing CaS into said oxidizer reactor, said CaS being discharged from said second CaS/gas outlet;

a second separator defining an inlet in fluid communication with said first $CaSO_4$/gas outlet, a first outlet for discharging gas therefrom, and a second $CaSO_4$/gas outlet;

a first $CaSO_4$ inlet defined by said reducer reactor for introducing $CaSO_4$ discharged from said second $CaSO_4$/gas outlet defined by said second separator therein;

a second $CaSO_4$ inlet defined by said oxidizer reactor for introducing $CaSO_4$ discharged from said second $CaSO_4$/gas outlet defined by said second separator therein; and wherein at least a portion of said chemical looping system is in fluid communication with at least a portion of an existing power generation system.

2. A system as defined by claim 1 further comprising a first solids control valve in fluid communication with said second CaS/gas outlet defined by said first separator, said first solids control valve defining a first outlet in fluid communication with said first CaS inlet and a second outlet in fluid communication with said second CaS inlet.

3. A system as defined by claim 2 further comprising a second solids control valve in fluid communication with said second $CaSO_4$/gas outlet defined by said second separator, said second solids control valve defining a first outlet in fluid communication with said first $CaSO_4$ inlet and a second outlet in fluid communication with said second $CaSO_4$ inlet.

4. A system as defined by claim 1, wherein:
said product gas is $H_2$, said product gas outlet being in fluid communication with a boiler, forming part of said existing power generation system, for the introduction of $H_2$ generated by said chemical looping system into said boiler.

5. A system as defined by claim 4 further comprising a calciner in fluid communication with said oxidizer reactor, said calciner defining a calcium inlet for introducing calcium containing material therein, and an outlet for discharging $CO_2$ therefrom.

6. A system as defined by claim 1 wherein said calcium containing material is in the form of limestone and said carbonaceous fuel is coal, said coal and said limestone being processed together in a coal processing device forming part of said existing power generation system prior to introduction into said reducer reactor.

7. A system as defined by claim 1 wherein:
said product gas is $CO_2$, and said chemical looping system further includes:
heat exchanger means for converting at least one of water, water vapor and steam into superheated steam, said superheated steam being fed into a steam turbine forming part of said existing power generation system.

8. A system as defined by claim 1 wherein said oxidizer reactor further comprises an outlet for the removal of at least one of ash and $CaSO_4$.

9. A system as defined by claim 1 further comprising a heat exchanger in fluid communication with said second CaS/gas outlet, said heat exchanger defining an outlet in fluid communication with said second CaS inlet defined by said oxidizer reactor.

10. A system as defined by claim 1 wherein said product gas outlet defined by said first separator and said gas outlet defined by said second separator are in fluid communication with an air preheater forming part of said existing power generation system.

11. A system as defined by claim 1 wherein a boiler forming part of said existing power generation system is used as said oxidizer reactor.

12. A system as defined by claim 1 wherein said second separator is positioned in a boiler forming part of said existing power generation system, said second separator and said boiler cooperating to form said oxidizer reactor.

13. A system as defined by claim 12 wherein said second separator is a cyclone.

14. A system as defined by claim 12 wherein said second separator is a curvilinear separator.

15. A system as defined by claim 1 wherein said product gas is $CO_2$.

16. A system as defined by claim 1 wherein the calcium containing material is one of at least limestone, dolomite, lime, or spent ash.

* * * * *